United States Patent
Lee et al.

(10) Patent No.: US 10,904,858 B2
(45) Date of Patent: Jan. 26, 2021

(54) METHOD AND DEVICE FOR TRANSMITTING UPLINK DURING A SPECIFIC RADIO RESOURCE CONTROL (RRC) STATE

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/483,397

(22) PCT Filed: Jan. 18, 2018

(86) PCT No.: PCT/KR2018/000843
§ 371 (c)(1),
(2) Date: Aug. 2, 2019

(87) PCT Pub. No.: WO2018/143585
PCT Pub. Date: Aug. 9, 2018

(65) Prior Publication Data
US 2020/0015191 A1      Jan. 9, 2020

Related U.S. Application Data

(60) Provisional application No. 62/453,997, filed on Feb. 2, 2017, provisional application No. 62/453,990, filed on Feb. 2, 2017.

(51) Int. Cl.
*H04W 68/00* (2009.01)
*H04W 76/11* (2018.01)
(Continued)

(52) U.S. Cl.
CPC ......... *H04W 68/005* (2013.01); *H04W 16/28* (2013.01); *H04W 74/0833* (2013.01); *H04W 76/11* (2018.02); *H04W 76/27* (2018.02)

(58) Field of Classification Search
None
See application file for complete search history.

(56) References Cited

U.S. PATENT DOCUMENTS

2008/0081645 A1* 4/2008 Kim ................... H04W 68/025
                                                  455/458
2009/0176525 A1   7/2009 Wang et al.
(Continued)

FOREIGN PATENT DOCUMENTS

EP      2903313         8/2015
EP      2903313 A1 *    8/2015   ............ H04W 68/02
(Continued)

OTHER PUBLICATIONS

PCT International Application No. PCT/KR2018/000843, International Search Report dated Apr. 26, 2018, 10 pages.
(Continued)

*Primary Examiner* — Anh Ngoc M Nguyen
(74) *Attorney, Agent, or Firm* — Lee Hong Degerman Kang Waimey

(57) ABSTRACT

Provided are a method for a terminal transmitting an uplink on the basis of an uplink feedback indicator in a wireless communication system, and a device supporting same. The method may comprise the steps of: receiving, from a base station, an uplink feedback indicator indicating whether uplink feedback for a paging indicator is enabled; receiving, from the base station, a paging indicator corresponding to the ID of the terminal; and transmitting an uplink as a
(Continued)

response to the paging indicator if the uplink feedback indicator indicates that uplink feedback for the paging indicator is enabled.

10 Claims, 13 Drawing Sheets

(51) Int. Cl.
  *H04W 76/27* (2018.01)
  *H04W 16/28* (2009.01)
  *H04W 74/08* (2009.01)

(56) References Cited

U.S. PATENT DOCUMENTS

| | | |
|---|---|---|
| 2011/0201361 A1 | 8/2011 | Montojo et al. |
| 2014/0148204 A1 | 5/2014 | Zeira et al. |
| 2016/0302251 A1* | 10/2016 | Chatterjee ......... H04W 52/0206 |
| 2018/0077680 A1* | 3/2018 | Tenny ................. H04W 68/005 |

FOREIGN PATENT DOCUMENTS

| | | |
|---|---|---|
| WO | 2011100497 | 8/2011 |
| WO | 2015094057 | 6/2015 |

OTHER PUBLICATIONS

LG Electronics, "On-demand paging in RRC_IDLE", 3GPP TSG RAN WG2 NR Ad Hoc, R2-1700443, Jan. 2017, 4 pages.
European Patent Office Application Serial No. 18748548.7, Search Report dated Jan. 8, 2020, 9 pages.
Nokia, et al., "Paigng in NR at HF operation", 3GPP TSG RAN WG2 Meeting #96, R2-168124, Nov. 2016, 6 pages.
LG Electronics, "On-demand paging in RRC_IDLE", 3GPP TSG RAN WG2 NR Ad Hoc, R2-1700443, Jan. 2017, 2 pages.

* cited by examiner

METHOD AND DEVICE FOR TRANSMITTING UPLINK DURING A SPECIFIC RADIO RESOURCE CONTROL (RRC) STATE

CROSS-REFERENCE TO RELATED APPLICATIONS

This application is the National Stage filing under 35 U.S.C. 371 of International Application No. PCT/KR2018/000843, filed on Jan. 18, 2018, which claims the benefit of U.S. Provisional Application No. 62/453,997, filed on Feb. 2, 2017, and 62/453,990, filed on Feb. 2, 2017, the contents of which are all hereby incorporated by reference herein in their entirety.

BACKGROUND OF THE INVENTION

Field of the Invention

The present invention relates to a wireless communication system and, most particularly, to a method for performing uplink transmission, by a user equipment (UE), based on an uplink feedback indicator and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beamforming, large scale antenna techniques are discussed in 5G communication systems.

SUMMARY OF THE INVENTION

Technical Objects

Meanwhile, a paging indicator may be shared by multiple user equipments (UEs). Therefore, when using a feedback based paging transmission, due to the reception of the shared paging indicator, some UEs may have to unnecessarily perform uplink access. In order to prevent the UEs from unnecessarily performing uplink access during the feedback based paging transmission, a method for performing uplink transmission by a user equipment (UE) and a device supporting the same need to be proposed.

Technical Solutions

According to an exemplary embodiment, provided herein is a method for performing uplink transmission, by a user equipment (UE), based on an uplink feedback indicator in a wireless communication system. The method may include the steps of receiving, from a base station, an uplink feedback indicator indicating whether or not uplink feedback for a paging indicator is enabled, receiving, from the base station, a paging indicator corresponding to an identity (ID) of the UE, and, if the uplink feedback indicator indicates that uplink feedback for the paging indicator is enabled, performing uplink transmission as a response to the paging indicator.

According to another exemplary embodiment, provided herein is a user equipment (UE) performing uplink transmission based on an uplink feedback indicator in a wireless communication system. The UE may include a memory, a transceiver, and a processor operatively connecting the memory and the transceiver, wherein the processor may control the transceiver so as to allow the transceiver to receive, from a base station, an uplink feedback indicator indicating whether or not uplink feedback for a paging indicator is enabled, to receive, from the base station, a paging indicator corresponding to an identity (ID) of the UE, and, if the uplink feedback indicator indicates that uplink feedback for the paging indicator is enabled, to perform uplink transmission as a response to the paging indicator.

Effects of the Invention

The user equipment (UE) may be prevented from unnecessarily performing uplink access.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
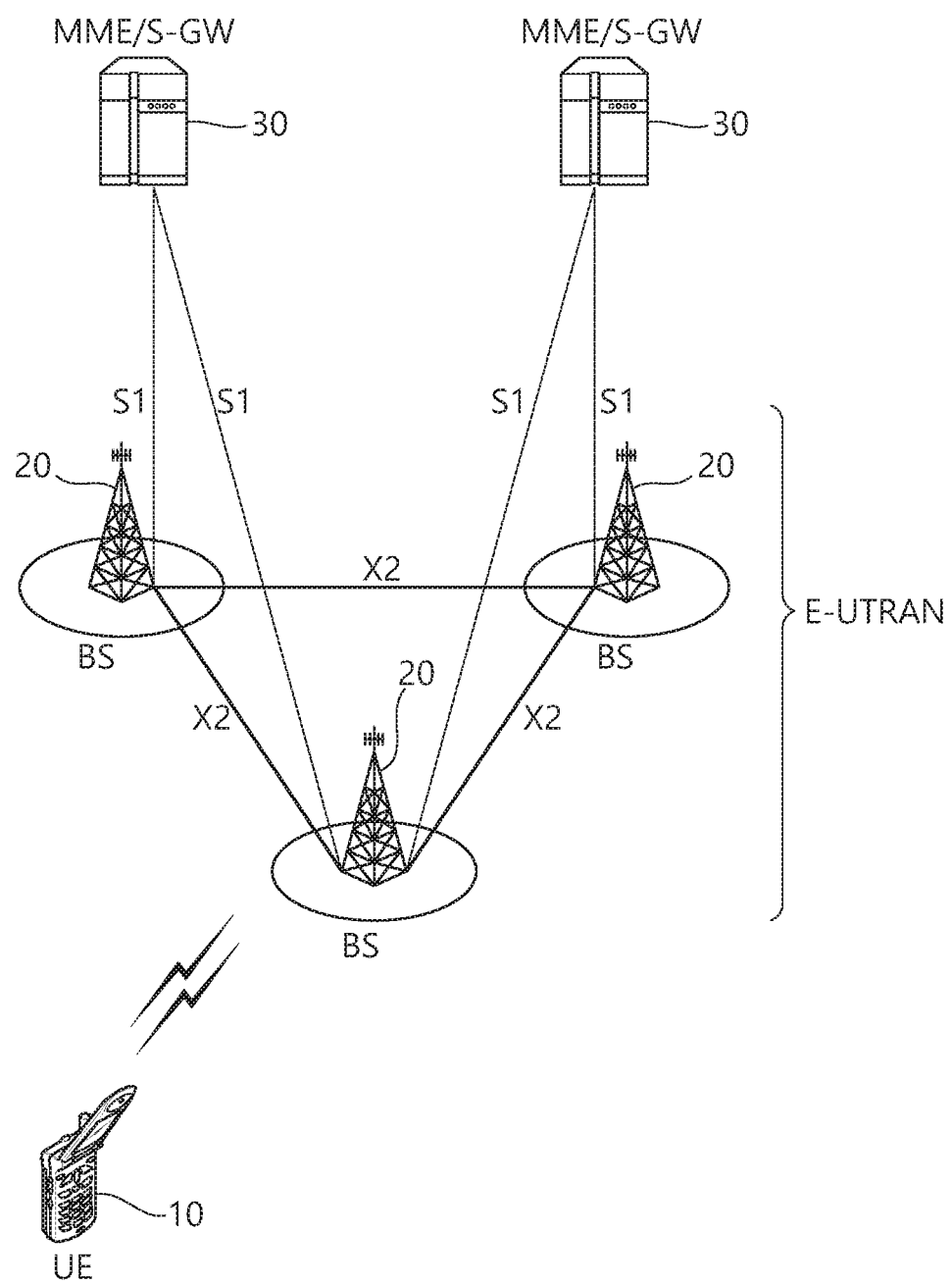
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE) (10), an evolved-UMTS terrestrial radio access network (E-UTRAN) and an evolved packet core (EPC). The UE (10) refers to a communication equipment carried by a user. The UE (10) may be fixed or mobile, and may be referred to as another terminology, such as a mobile station (MS), a user terminal (UT), a subscriber station (SS), a wireless device, etc.

The E-UTRAN includes one or more evolved node-B (eNB) (20), and a plurality of UEs may be located in one cell. The eNB (20) provides an end point of a control plane and a user plane to the UE (10). The eNB (20) is generally a fixed station that communicates with the UE (10) and may be referred to as another terminology, such as a base station (BS), a base transceiver system (BTS), an access point, etc. One eNB (20) may be deployed per cell. There are one or more cells within the coverage of the eNB (20). A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB (20) to the UE (10), and an uplink (UL) denotes communication from the UE (10) to the eNB (20). In the DL, a transmitter may be a part of the eNB (20), and a receiver may be a part of the UE (10). In the UL, the transmitter may be a part of the UE (10), and the receiver may be a part of the eNB (20).

The EPC includes a mobility management entity (MME) which is in charge of control plane functions, and a system architecture evolution (SAE) gateway (S-GW) which is in charge of user plane functions. The MME/S-GW (30) may be positioned at the end of the network and connected to an external network. The MME has UE access information or UE capability information, and such information may be primarily used in UE mobility management. The S-GW is a gateway of which an endpoint is an E-UTRAN. The MME/S-GW (30) provides an end point of a session and mobility management function for the UE (10). The EPC may further include a packet data network (PDN) gateway (PDN-GW). The PDN-GW is a gateway of which an endpoint is a PDN.

The MME provides various functions including non-access stratum (NAS) signaling to eNBs (20), NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW (30) will be referred to herein simply as a "gateway," but it is understood that this entity includes both the MME and S-GW.

Interfaces for transmitting user traffic or control traffic may be used. The UE (10) and the eNB (20) are connected by means of a Uu interface. The eNBs (20) are interconnected by means of an X2 interface. Neighbor eNBs may have a meshed network structure that has the X2 interface. The eNBs (20) are connected to the EPC by means of an S1 interface. The eNBs (20) are connected to the MME by means of an S1-MME interface, and are connected to the S-GW by means of S1-U interface. The S1 interface supports a many-to-many relation between the eNB (20) and the MME/S-GW.

The eNB (20) may perform functions of selection for gateway (30), routing toward the gateway (30) during a radio resource control (RRC) activation, scheduling and transmitting of paging messages, scheduling and transmitting of broadcast channel (BCH) information, dynamic allocation of resources to the UEs (10) in both UL and DL, configuration and provisioning of eNB measurements, radio bearer control, radio admission control (RAC), and connection mobility control in LTE_ACTIVE state. In the EPC, and as noted above, gateway (30) may perform functions of paging origination, LTE_IDLE state management, ciphering of the user plane, SAE bearer control, and ciphering and integrity protection of NAS signaling.

Figure 2:
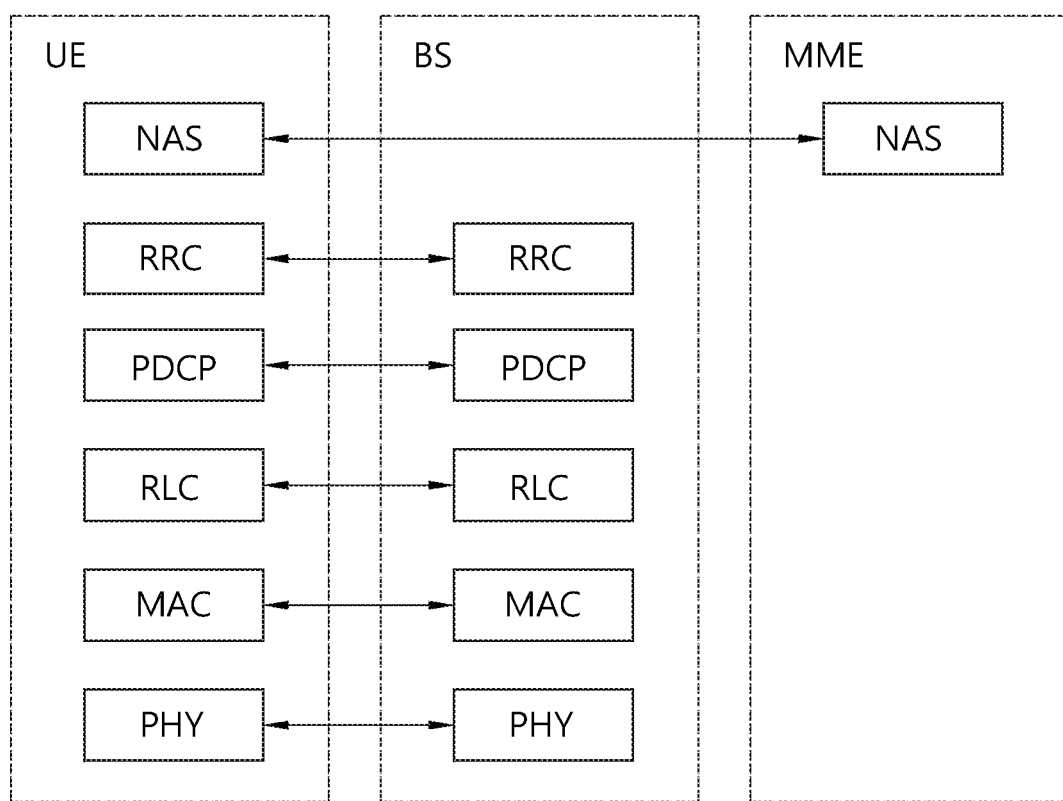
FIG. 2 shows a control plane of a radio interface protocol of an LTE system.
Figure 3:
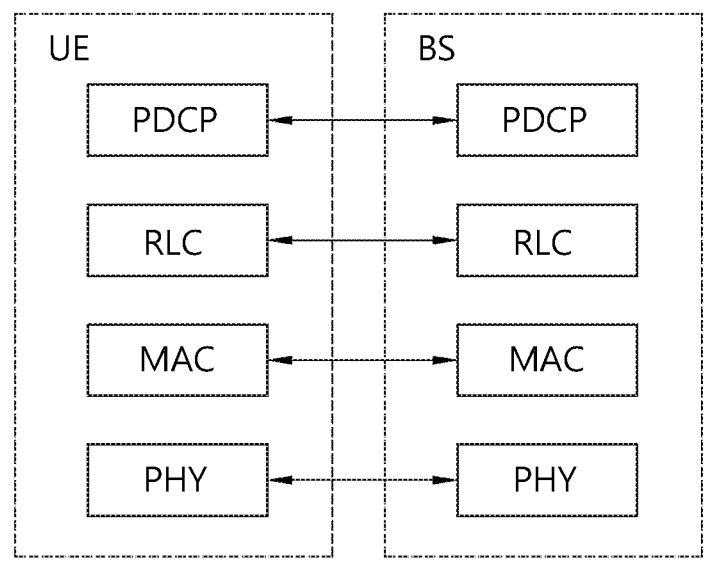
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and an RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE needs to transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G Network Structure is Described.

Figure 4:
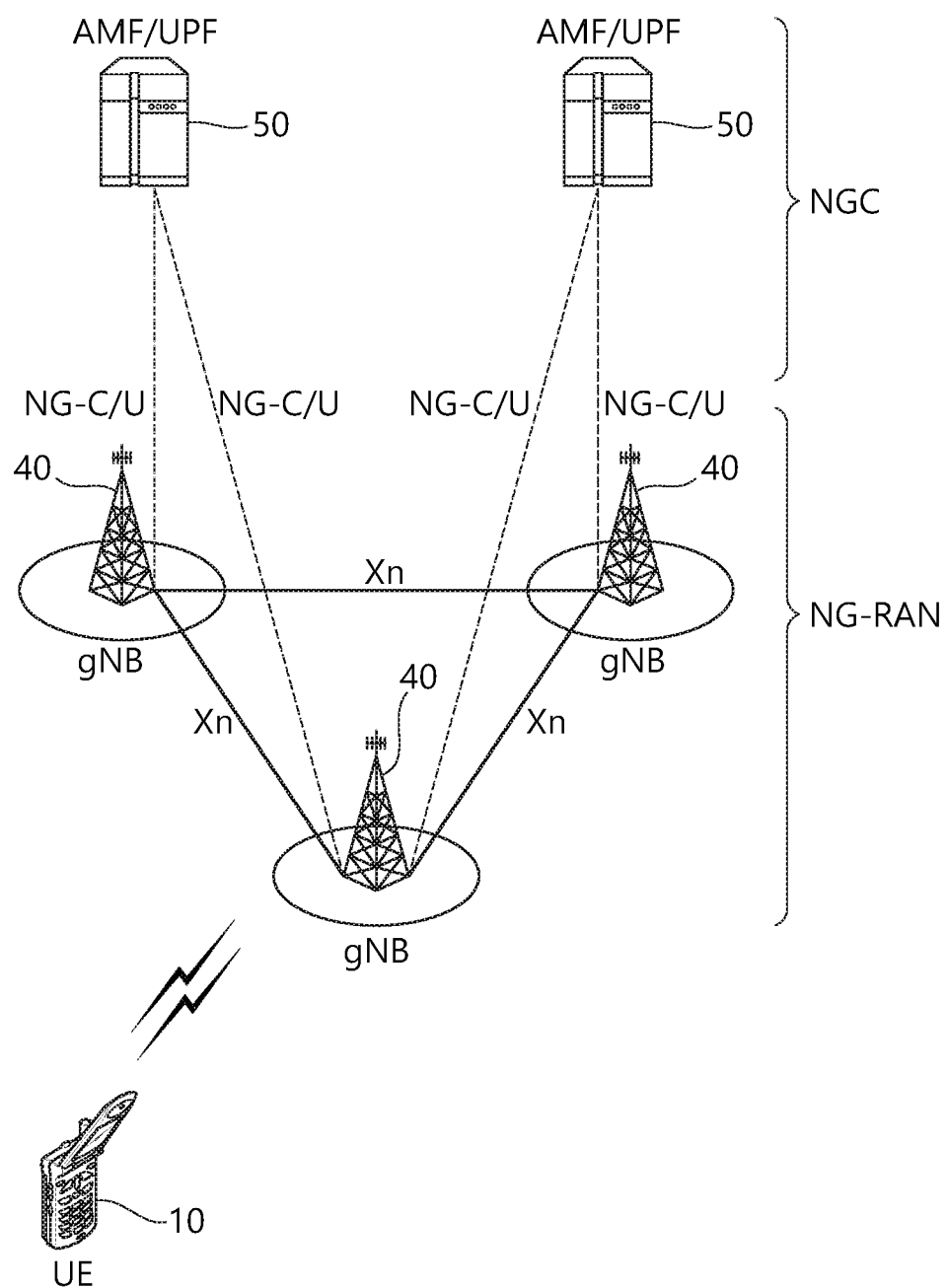
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NG-C interface, and may be connected to a UPF by means of an NG-U interface. The NG interface supports a many-to-many-relation between the gNB (40) and the AMF/UPF (50).

A gNB host may perform functions such as functions for radio resource management, IP header compression, and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and an NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

For a UE in a lightly connected mode, an MME may maintain the S1 connection of the activated UE in order to hide a state transition and mobility from a core network. That is, for a UE in the RRC_INACTIVE state, an AMF may maintain the NG connection of the activated UE in order to hide a state transition and mobility from a next-generation core (NGC). In this specification, an RRC_INACTIVE state may be similar in concept to a lightly connected mode, a lightweight connected mode, or a semi-connected mode.

Hereinafter, Beamforming will be Described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 5:
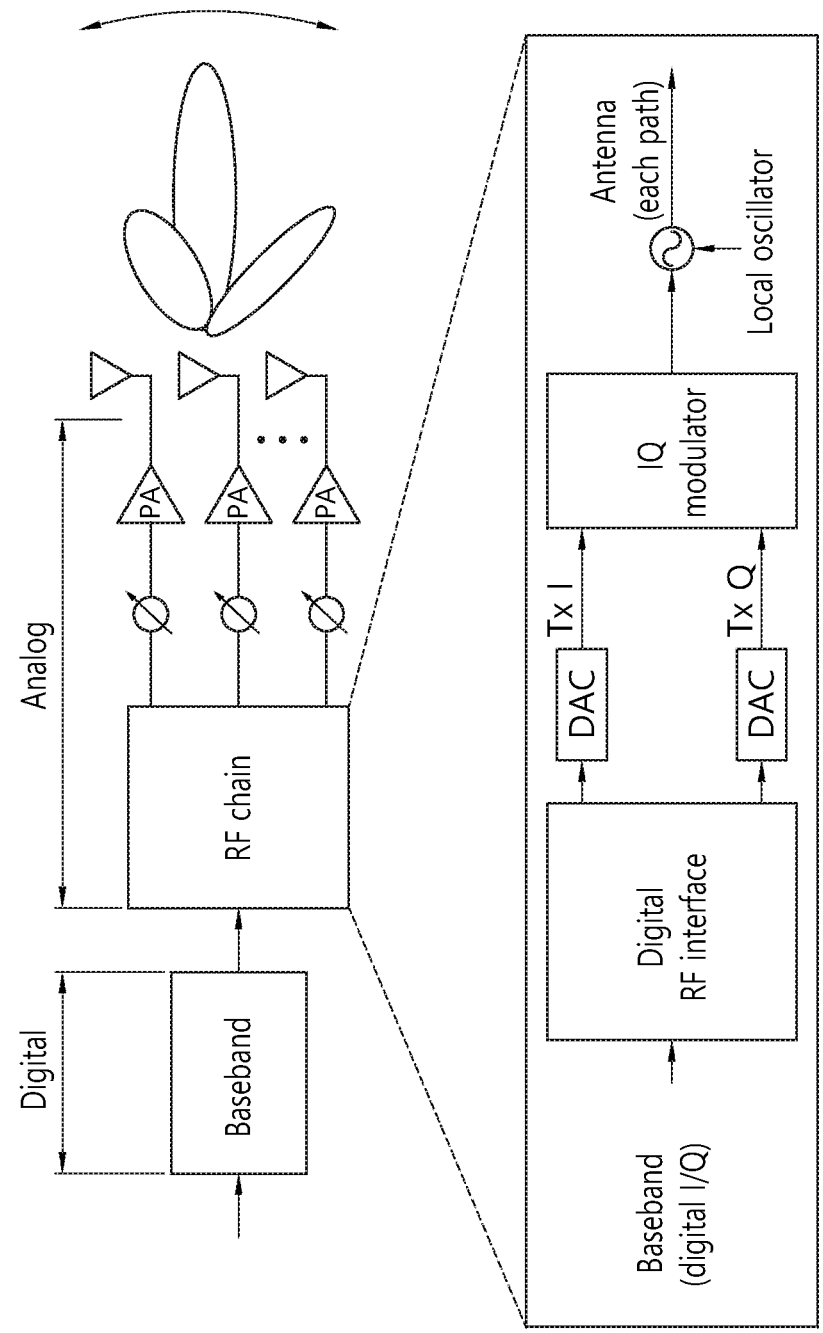
FIG. 5 shows an example of an analog beamforming.

FIG. 5 shows an example of an analog beamforming.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 5, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 6:
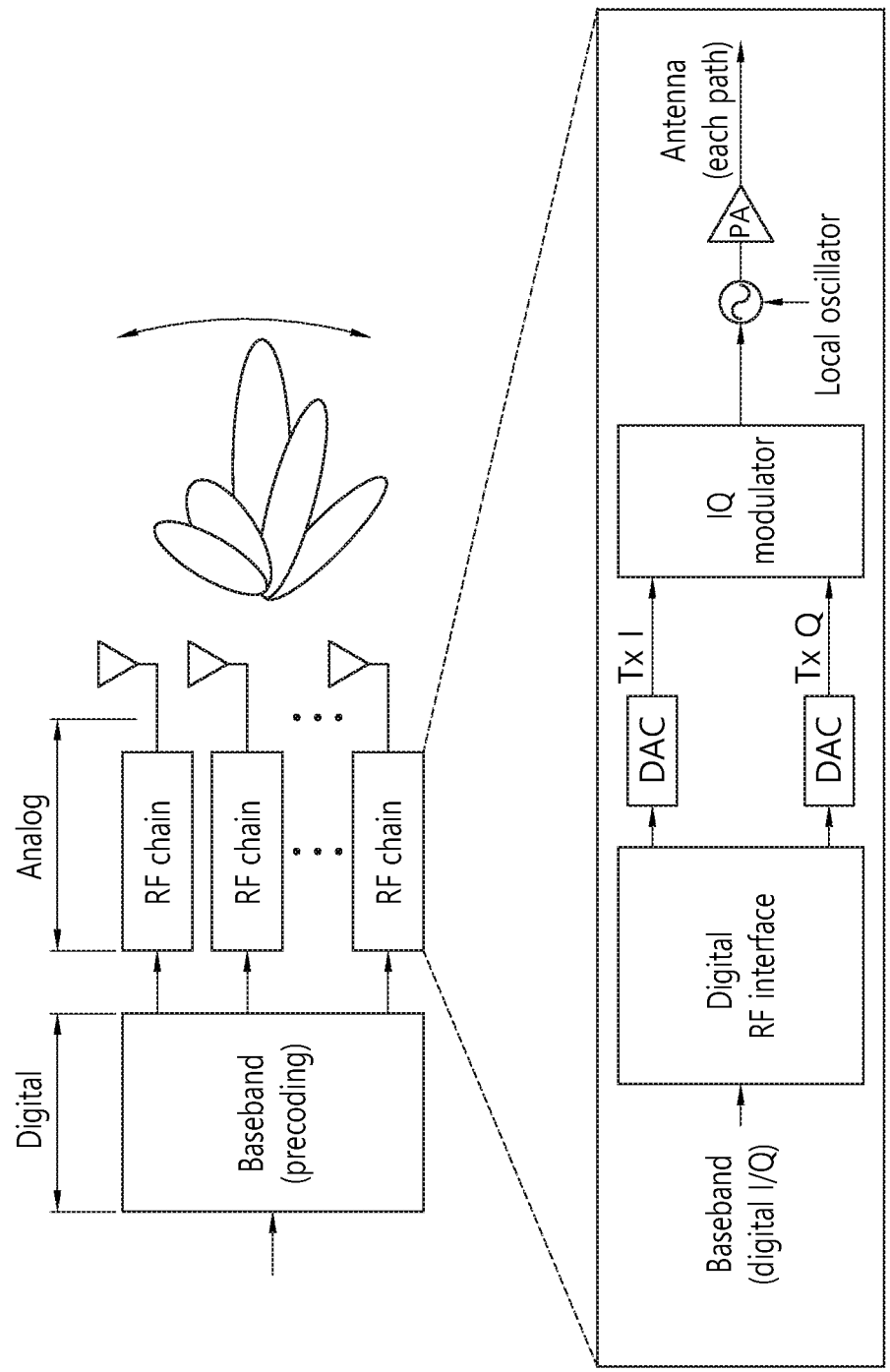
FIG. 6 shows an example of a digital beamforming.

FIG. 6 shows an Example of a Digital Beamforming.

In digital beamforming, as opposed to analog beamforming, a beam is formed in the digital stage by a baseband process, in order to maximize diversity and multiplexing gain in an MIMO environment. Referring to FIG. 6, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in a MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 7:
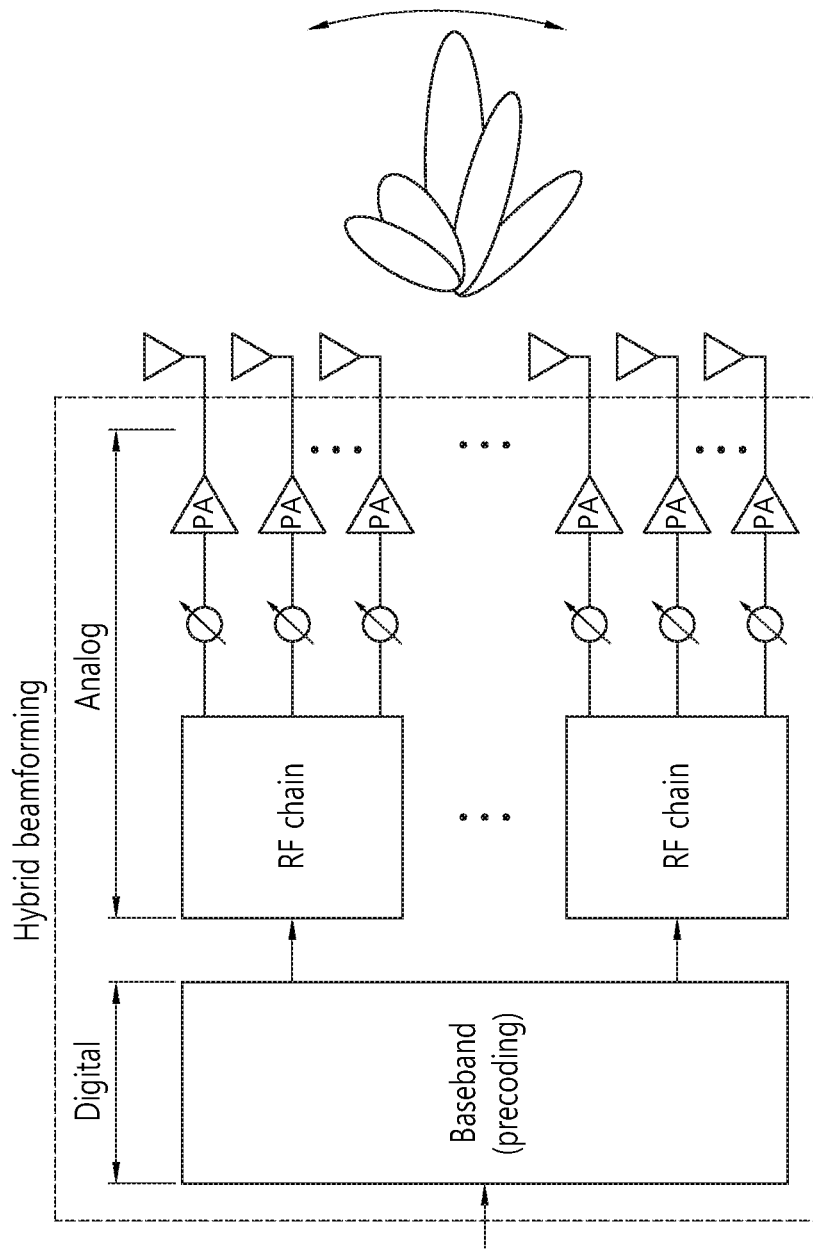
FIG. 7 shows an example of the hybrid beamforming.

FIG. 7 shows an example of the hybrid beamforming.

As described above, the hybrid beamforming is aimed at configuring a transmitting end capable of taking advantage of the advantages of analog beamforming and digital beamforming in a large MIMO environment. Referring to FIG. 7, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

Meanwhile, a paging indicator may be shared by multiple user equipments (UEs). Therefore, when using a feedback based paging transmission, due to the reception of the shared paging indicator, some UEs may have to unnecessarily perform uplink access. In order to prevent the UEs from unnecessarily performing uplink access during the feedback based paging transmission, a method for performing uplink transmission by a user equipment (UE) and a device supporting the same need to be proposed.

Figure 8:
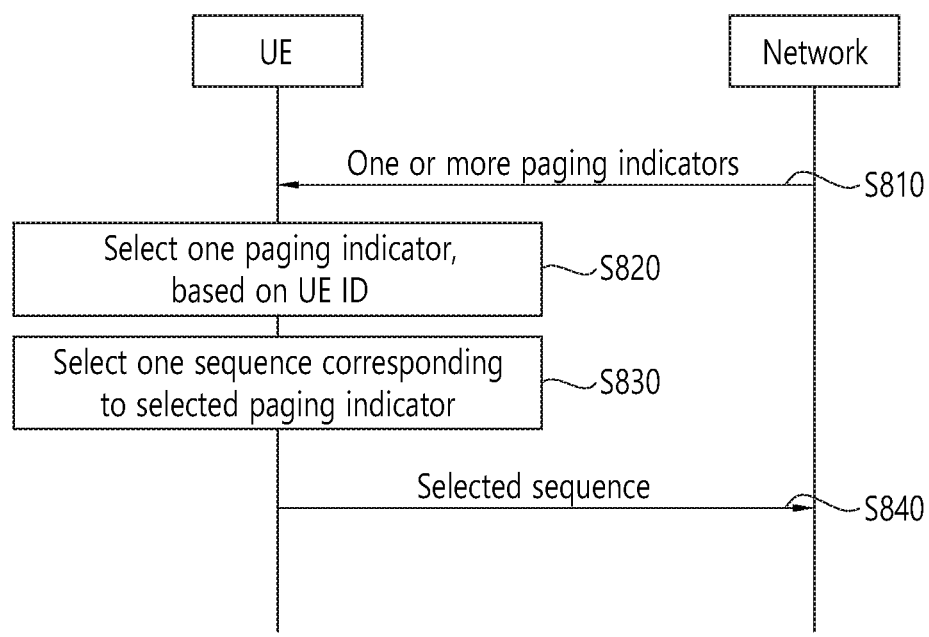
FIG. 8 shows a procedure of performing an uplink transmission by a user equipment (UE) according to an exemplary embodiment of the present invention.

FIG. 8 shows a procedure of performing an uplink transmission by a user equipment (UE) according to an exemplary embodiment of the present invention.

Referring to FIG. 8, in step S810, the UE may periodically monitor a paging occasion where one or more paging indicators can be transmitted.

In step S820, the UE may select a paging indicator among the one or more paging indicators of the paging occasion. The one paging indicator may be selected by using a UE identity (ID), which is stored in the UE.

In step S830, the UE may select one sequence among one or more sequences being matched with the selected paging indicator. The sequence may correspond to any one of a specific ID being assigned by the UE and a random access preamble.

In step S840, if the UE detects the selected paging indicator in the paging occasion, the UE may transmit the selected sequence in an uplink. More specifically, if the UE detects the selected paging indicator in the paging occasion, the UE may initiate a random access procedure and may transmit the selected sequence during the random access procedure. For example, the selected sequence may be transmitted as a random access preamble or by including the selected sequence in a message 3 on a UL-SCH.

Figure 9:
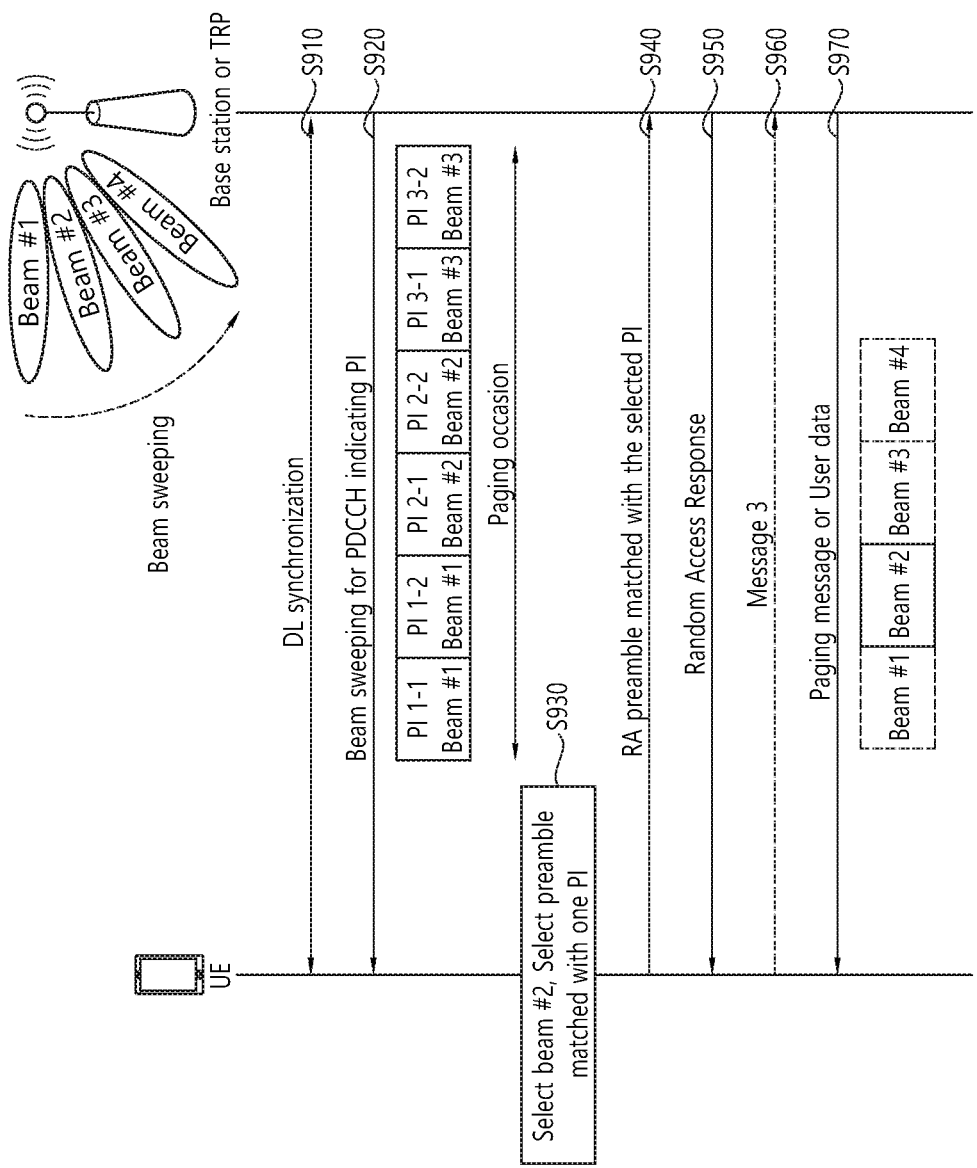
FIG. 9 shows a procedure of performing an uplink transmission by a user equipment (UE) according to an exemplary embodiment of the present invention.

FIG. 9 shows a procedure of performing an uplink transmission by a user equipment (UE) according to an exemplary embodiment of the present invention.

Referring to FIG. 9, in step S910, UEs may perform downlink synchronization to the TRP or a cell of a base station (or eNB). A UE may receive system information from the base station. The system information may include at least any one of a master information block (MIB), a system information block (SIB), minimum system information, and other system information. The minimum system information may correspond to system information being periodically broadcasted. Other system information may correspond to all system information not being broadcasted from the minimum system information. By requesting system information to the base station, the UE may acquire the other system information. The system information may signal a System Frame Number (SFN) and a hyper System Frame Number (SFN).

The UE may calculate a paging interval during which the UE shall monitor a paging channel in order to receive a paging indicator (PI) or a paging message. The paging interval may correspond to any one of a Paging Hyper frame, a Paging (radio) Frame, a Paging Time Window, and a paging occasion that are calculated based on a UE ID and/or the selected beam index (e.g., beam index #2). The paging interval may be calculated based on the UE ID. The paging indicator may correspond to an RNTI, such as a P-RNTI. The paging indicator may be included in Downlink Control Information (DCI) of a PDCCH, which is addressed by the P-RNTI. The paging message may be transmitted over a PDSCH.

One paging interval (e.g., one paging occasion), which is selected by the UE based on the UE ID, may include one or more paging indicators. The UE may select one paging indicator among the one or more paging indicators of the paging occasion. A UE identity (ID), which is stored in the UE, may be used for selecting the one paging indicator among the one or more paging indicators. For example, the UE ID may correspond to at least any one of a Resume ID, an s-TMSI, an IMSI, and a C-RNTI.

In step S920, the base station may transmit multiple beams in the paging interval. In the paging interval, the base station may fully or partially sweep its antenna beams. Different beams may be transmitted at different time intervals. For example, the time interval may correspond to subframes or symbols. If possible, different beams may be transmitted at different time intervals along with a Beam Reference Signal (BRS). The different beams may transmit one or more paging indicators. Each of the one or more paging indicators may indicate a group of UE IDs, a specific type of UE (e.g., delay tolerant devices or vehicular UEs), a specific UE category, a specific service, and a group of services.

The base station may transmit one or more paging indicators in each paging occasion. The paging indicators of each paging occasion may be repeated in different time slots. Different time slots may correspond to different beams. When the base station performs beam sweeping, the base station may transmit different beams in different time slots. The base station may perform beam sweeping by using a paging indicator of a paging occasion.

For example, the base station may transmit all paging indicators of the paging occasion by using a first beam. And, the base station may change (or switch) to a second beam and may, then, transmit all paging indicators of the paging occasion by using the second beam. Thereafter, the base station may change (or switch) to a third beam and, may, then transmit all paging indicators of the paging occasion by using the third beam. Finally, the base station may change (or switch) to a last beam and may, then, transmit all paging indicators of the paging occasion by using the last beam.

Alternatively, for example, the base station may transmit a first paging indicator of the paging occasion by using different beams. And, the base station may transmit a second paging indicator by using different beams. Then, the base station may transmit a third paging indicator of the paging occasion by using different beams. And, finally, the base station may transmit a last paging indicator of the paging occasion by using different beams. More specifically, the base station may transmit one paging indicator by using beam sweeping.

In step S930, a UE may measure the quality of each beam by receiving different beams at different time intervals. The UE may select a beam providing a highest measured quality among all of the beams. Alternatively, the UE may select one or more beams having a measured quality exceeding a threshold value. Alternatively, the UE may select one or more beams having a measured quality being equal to or greater than a threshold value. In the exemplary embodiment of FIG. 9, it will be assumed that the UE selects beam #2.

Additionally, the UE may receive or detect the selected paging indicator in the paging occasion, which is monitored by the UE. If the selected paging indicator is received or detected in the paging occasion, which is monitored by the UE, the UE may select a random access preamble, which is matched with the selected paging indicator. Alternatively, if the selected paging indicator is received or detected in the paging occasion, which is monitored by the UE, the UE may select a random access preamble, which is matched with the UE ID being stored in the UE. If multiple matching random access preambles exist, the UE may select one of the matching random access preambles by using the UE ID, which is stored in the UE.

In step S940, the UE may transmit the selected random access preamble.

In step S950, if the selected random access preamble is received, the base station may transmit a Random Access Response (RAR) message. The RAR message may include at least any one of a random access preamble identifier (RAPID) corresponding to the selected random access preamble, an uplink (UL) grant, and a UE ID of a paged UE. The UE ID may correspond to at least one of a C-RNTI, a Resume ID, and s-TMSI.

In step S960, in case the UE receives the Random Access Response (RAR) message, if the random access message includes the UE ID, and if the UE ID included in the random access message is matched with a UE ID stored in the UE, the UE may transmit a message 3 over the UL-SCH. Otherwise, the UE may not transmit a message 3.

The message 3 may include a UE ID, which may correspond to at least any one of a C-RNTI, a Resume ID, and an s-TMSI. The UE identity may be included as part of a MAC Control Element or RRC message, which is to be transmitted via the message 3. The UE ID included in the message 3 may be same as the UE ID included in the RAR message. Alternatively, the UE ID included in the message 3 may be different from the UE ID included in the RAR message. Additionally, the message 3 may also include a beam index of the selected beam In step S970, if the base station receives the message 3 including the beam index of the selected beam, the base station may send a paging message or user data via the selected beam in the paging occasion. The paging occasion may be calculated based on the UE ID and/or the beam index.

During a predetermined period after the message 3 is transmitted, the UE may monitor only the selected beam. The selected beam may be monitored in a full paging occasion or part of the paging occasion where the selected beam is transmitted. More specifically, the UE may monitor only the selected beam until a timer expires. The UE may receive a value of the timer via system information transmitted from the base station. If no paging message or user data including the UE ID is received during the specific period (i.e., until the timer expires), the UE may monitor all of the beams in paging intervals or paging occasions.

Figure 10:
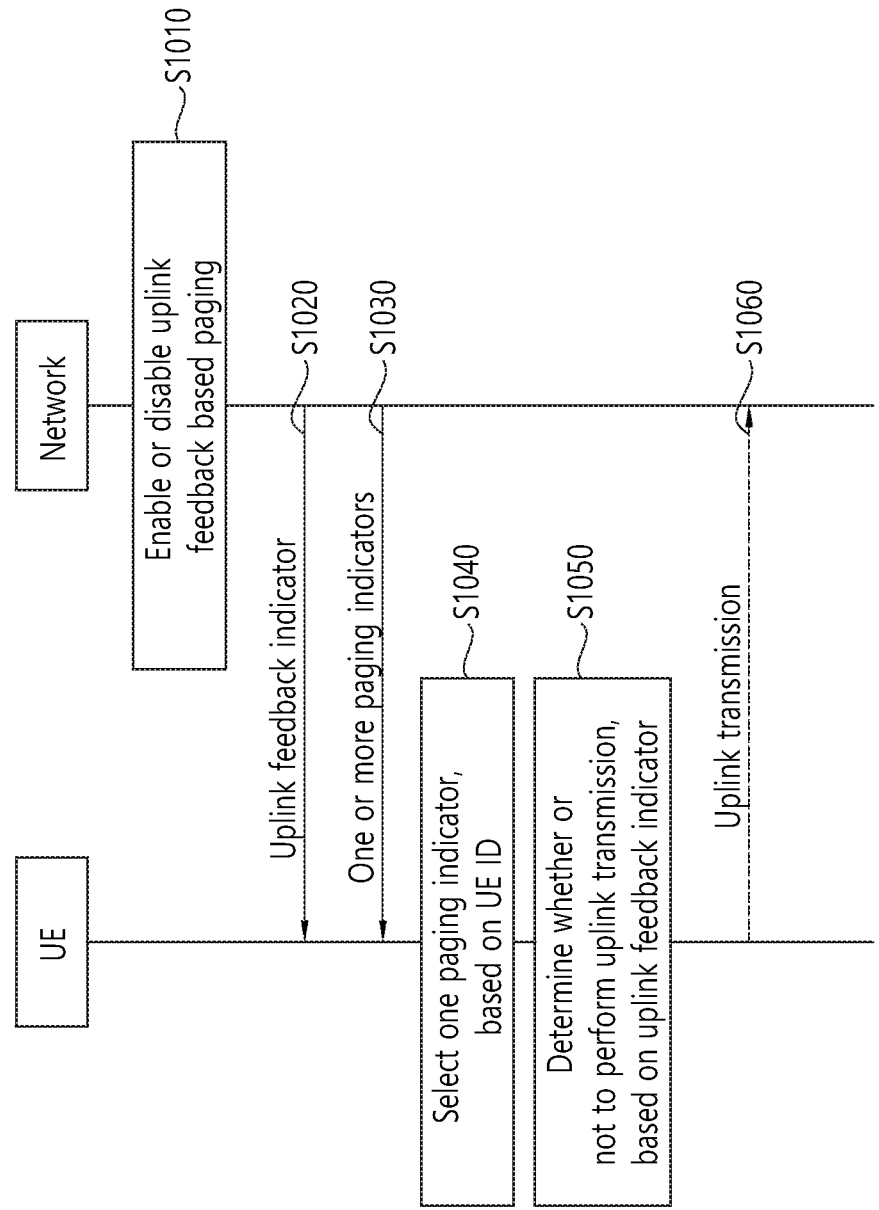
FIG. 10 shows a procedure of performing an uplink transmission by a user equipment (UE) based on an uplink feedback indicator according to an exemplary embodiment of the present invention.

FIG. 10 shows a procedure of performing an uplink transmission by a user equipment (UE) based on an uplink feedback indicator according to an exemplary embodiment of the present invention.

Referring to FIG. 10, in step S1010, a network may enable or disable uplink feedback based paging. The uplink feedback based paging may also be referred to as uplink feedback based notification.

In step S1020, the network may inform one or more UEs whether an uplink feedback to paging/notification is enabled or disabled via an indicator. The indicator may also be referred to as an uplink feedback indicator. The indicator may be signaled by system information. For example, the indicator may be signaled by minimum system information on a PDSCH or PBCH. Alternatively, the indicator may be received via dedicated signaling.

The indicator may be signaled for each area. For example, the indicator may be signaled per cell. In this case, the UE may determine whether an uplink feedback is enabled or disabled per cell. For example, the indicator may be signaled per RAN based notification area. In this case, the UE may determine whether an uplink feedback is enabled or disabled per RAN based notification area. For example, the indicator may be signaled per Tracking Area. In this case, the UE may determine whether an uplink feedback is enabled or disabled per Tracking Area.

The indicator may be signaled for each RRC state. For example, the indicator may correspond to a RAN notification in an RRC_INACTIVE state. In this case, the UE may determine whether the uplink feedback is enabled or disabled for the RAN notification in the RRC_INACTIVE state. For example, the indicator may correspond to CN paging in an RRC_IDLE state. In this case, the UE may determine whether the uplink feedback is enabled or disabled for the CN paging in the RRC_IDLE state.

In step S1030, the UE may periodically monitor a paging occasion where one or more paging indicators can be transmitted.

In step S1040, the UE may select a paging indicator among the one or more paging indicators of the paging occasion. The one paging indicator may be selected by using a UE identity (ID), which is stored in the UE.

In step S1050, if the UE receives an indicator enabling uplink feedback, and if the UE receives a paging indicator corresponding to the UE, in step S1060, the UE may perform uplink transmission. Alternatively, if the UE receives an indicator enabling uplink feedback, and if the UE receives a paging message corresponding to the UE, in step S1060, the UE may perform uplink transmission. For example, in case the indicator is signaled per area, the UE may perform uplink transmission while being present in an area corresponding to the indicator. For example, in case the indicator is signaled per RRC state, the UE may perform uplink transmission while being in an RRC state corresponding to the indicator. If the UE perform uplink transmission as a response to the paging indicator, the UE may receive a paging message after the uplink transmission.

Alternatively, in step S1050, if the UE receives an indicator disabling uplink feedback, and if the UE receives a paging indicator corresponding to the UE, the UE may not perform uplink transmission. Alternatively, if the UE receives an indicator disabling uplink feedback, and if the UE receives a paging message corresponding to the UE, the UE may not perform uplink transmission. For example, in case the indicator is signaled per area, the UE may not perform uplink transmission while being present in an area corresponding to the indicator. For example, in case the indicator is signaled per RRC state, the UE may not perform uplink transmission while being in an RRC state corresponding to the indicator.

Figure 11:
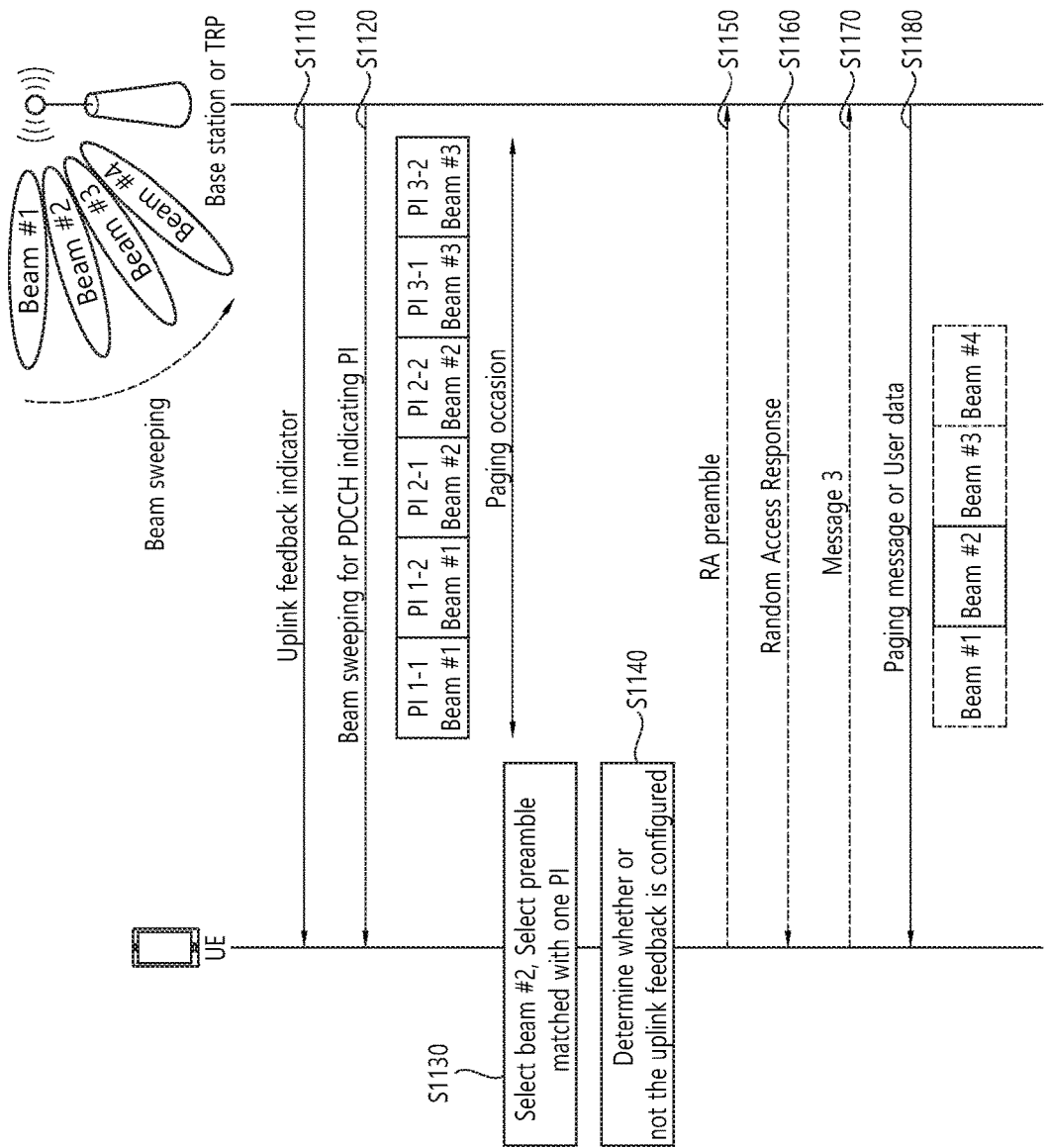
FIG. 11 shows a procedure of performing an uplink transmission by a user equipment (UE) based on an uplink feedback indicator according to an exemplary embodiment of the present invention.

FIG. 11 shows a procedure of performing an uplink transmission by a user equipment (UE) based on an uplink feedback indicator according to an exemplary embodiment of the present invention.

Referring to FIG. 11, in step S1110, UEs may perform downlink synchronization to the TRP or a cell of a base station. A UE may receive system information from the base station. The system information may include at least any one of a master information block (MIB), a system information block (SIB), minimum system information, and other system information. The minimum system information may correspond to system information being periodically broadcasted. Other system information may correspond to all system information not being broadcasted from the minimum system information. By requesting system information to the base station, the UE may acquire the other system information. The system information may signal a System Frame Number (SFN) and a hyper System Frame Number (SFN).

The UE may calculate a paging interval during which the UE shall monitor a paging channel in order to receive a paging indicator (PI) or a paging message. The paging interval may correspond to any one of a Paging Hyper frame, a Paging (radio) Frame, a Paging Time Window, and a paging occasion that are calculated based on a UE ID and/or the selected beam index (e.g., beam index #2). The paging interval may be calculated based on the UE ID. The paging indicator may correspond to an RNTI, such as a P-RNTI. The paging indicator may be included in Downlink Control Information (DCI) of a PDCCH, which is addressed by the P-RNTI. The paging message may be transmitted over a PDSCH.

One paging interval (e.g., one paging occasion), which is selected by the UE based on the UE ID, may include one or more paging indicators. The UE may select one paging indicator among the one or more paging indicators of the paging occasion. A UE identity (ID), which is stored in the UE, may be used for selecting the one paging indicator among the one or more paging indicators. For example, the UE ID may correspond to at least any one of a Resume ID, an s-TMSI, an IMSI, and a C-RNTI.

The base station may transmit an indicator indicating whether an uplink feedback to paging/notification is enabled or disabled to one or more UEs. The indicator may also be referred to as an uplink feedback indicator. The indicator may be signaled by system information. For example, the indicator may be signaled by minimum system information on a PDSCH or PBCH. Alternatively, the indicator may be received via dedicated signaling.

The indicator may be signaled for each area. For example, the indicator may be signaled per cell. In this case, the UE may determine whether an uplink feedback is enabled or disabled per cell. For example, the indicator may be signaled per RAN based notification area. In this case, the UE may determine whether an uplink feedback is enabled or disabled per RAN based notification area. For example, the indicator may be signaled per Tracking Area. In this case, the UE may determine whether an uplink feedback is enabled or disabled per Tracking Area.

The indicator may be signaled for each RRC state. For example, the indicator may correspond to a RAN notification in an RRC_INACTIVE state. In this case, the UE may determine whether the uplink feedback is enabled or disabled for the RAN notification in the RRC_INACTIVE state. For example, the indicator may correspond to CN paging in an RRC_IDLE state. In this case, the UE may determine whether the uplink feedback is enabled or disabled for the CN paging in the RRC_IDLE state.

In step S1120, the base station may transmit multiple beams in the paging interval. In the paging interval, the base station may fully or partially sweep its antenna beams. Different beams may be transmitted at different time intervals. For example, the time interval may correspond to subframes or symbols. If possible, different beams may be transmitted at different time intervals along with a Beam Reference Signal (BRS). The different beams may transmit one or more paging indicators. Each of the one or more paging indicators may indicate a group of UE IDs, a specific type of UE (e.g., delay tolerant devices or vehicular UEs), a specific UE category, a specific service, and a group of services.

The base station may transmit one or more paging indicators in each paging occasion. The paging indicators of each paging occasion may be repeated in different time slots. Different time slots may correspond to different beams. When the base station performs beam sweeping, the base station may transmit different beams in different time slots. The base station may perform beam sweeping by using a paging indicator of a paging occasion.

For example, the base station may transmit all paging indicators of the paging occasion by using a first beam. And, the base station may change (or switch) to a second beam and may, then, transmit all paging indicators of the paging occasion by using the second beam. Thereafter, the base station may change (or switch) to a third beam and, may, then transmit all paging indicators of the paging occasion by using the third beam. Finally, the base station may change (or switch) to a last beam and may, then, transmit all paging indicators of the paging occasion by using the last beam.

Alternatively, for example, the base station may transmit a first paging indicator of the paging occasion by using different beams. And, the base station may transmit a second paging indicator by using different beams. Then, the base station may transmit a third paging indicator of the paging occasion by using different beams. And, finally, the base station may transmit a last paging indicator of the paging occasion by using different beams. More specifically, the base station may transmit one paging indicator by using beam sweeping.

In step S1130, a UE may measure the quality of each beam by receiving different beams at different time intervals. The UE may select a beam providing a highest measured quality among all of the beams. Alternatively, the UE may select one or more beams having a measured quality exceeding a threshold value. Alternatively, the UE may select one or more beams having a measured quality being equal to or greater than a threshold value. In the exemplary embodiment of FIG. 9, it will be assumed that the UE selects beam #2.

Additionally, the UE may receive or detect the selected paging indicator in the paging occasion, which is monitored by the UE. If an indicator enabling uplink feedback is received, and if the selected paging indicator is received or detected in the paging occasion, which is monitored by the UE, the UE may select a random access preamble, which is matched with the selected paging indicator. Alternatively, if the selected paging indicator is received or detected in the paging occasion, which is monitored by the UE, the UE may select a random access preamble, which is matched with the UE ID being stored in the UE. If multiple matching random access preambles exist, the UE may select one of the matching random access preambles by using the UE ID, which is stored in the UE.

In step S1140, the UE may determine whether or not uplink feedback is configured (or set up). For example, if the UE receives an indicator enabling uplink feedback for an area or RRC state, and if the uplink feedback is yet to be configured (or set up), the UE may set up the uplink feedback while being present in the area or while being in the RRC state. For example, if the UE receives an indicator disabling uplink feedback for an area or RRC state, and if the uplink feedback has already been configured (or set up), the UE may release the configuration (or setup) of the uplink feedback while being present in the area or while being in the RRC state.

In step S1150, the UE may transmit the selected random access preamble. However, if an indicator disabling uplink feedback is received, the UE may not transmit the selected random access preamble. Alternatively, if an indicator enabling or disabling uplink feedback is received, the UE may not transmit the selected random access preamble. More specifically, the UE may not perform a random access procedure. In this case, the process steps from S1150 to S1170 may be omitted.

In step S1160, if the selected random access preamble is received, the base station may transmit a Random Access Response (RAR) message. The RAR message may include at least any one of a random access preamble identifier (RAPID) corresponding to the selected random access preamble, an uplink (UL) grant, and a UE ID of a paged UE. The UE ID may correspond to at least one of a C-RNTI, a Resume ID, and s-TMSI.

In step S1170, in case the UE receives the Random Access Response (RAR) message, if the random access message includes the UE ID, and if the UE ID included in the random access message is matched with a UE ID stored in the UE, the UE may transmit a message 3 over the UL-SCH. Otherwise, the UE may not transmit a message 3.

The message 3 may include a UE ID, which may correspond to at least any one of a C-RNTI, a Resume ID, and an s-TMSI. The UE identity may be included as part of a MAC Control Element or RRC message, which is to be transmitted via the message 3. The UE ID included in the message 3 may be same as the UE ID included in the RAR message. Alternatively, the UE ID included in the message 3 may be different from the UE ID included in the RAR message. Additionally, the message 3 may also include a beam index of the selected beam In step S1180, if the base station receives the message 3 including the beam index of the selected beam, the base station may send a paging message or user data via the selected beam in the paging occasion. The paging occasion may be calculated based on the UE ID and/or the beam index.

During a predetermined period after the message 3 is transmitted, the UE may monitor only the selected beam. The selected beam may be monitored in a full paging occasion or part of the paging occasion where the selected beam is transmitted. More specifically, the UE may monitor only the selected beam until a timer expires. The UE may receive a value of the timer via system information transmitted from the base station. If no paging message or user data including the UE ID is received during the specific period (i.e., until the timer expires), the UE may monitor all of the beams in paging intervals or paging occasions.

According to the exemplary embodiment of the present invention, in case the paging indicator is shared by multiple UEs, a UE may not perform unnecessary uplink access based on an uplink feedback indicator. Furthermore, by having the network provide an uplink feedback indicator to the UE per RRC state or per area, a UE of a specific RRC state or specific area may enable or disable the uplink feedback.

Figure 12:
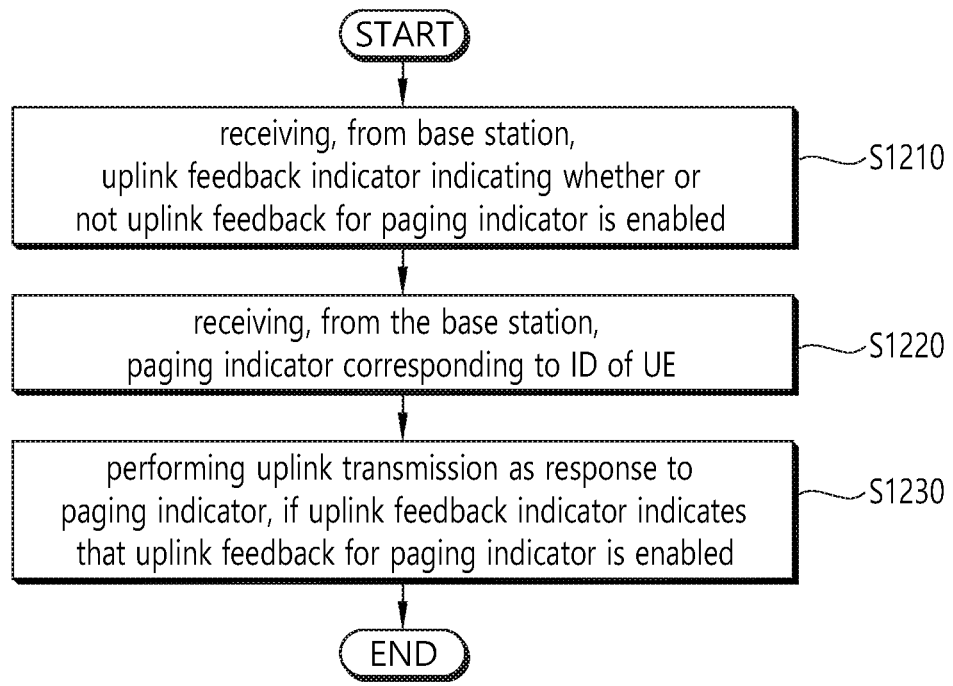
FIG. 12 is a block diagram showing a method for performing an uplink transmission by a user equipment (UE) based on an uplink feedback indicator in a wireless communication system according to an exemplary embodiment of the present invention.

FIG. 12 is a block diagram showing a method for performing an uplink transmission by a user equipment (UE) based on an uplink feedback indicator in a wireless communication system according to an exemplary embodiment of the present invention.

Referring to FIG. 12, in step S1210, a UE may receive, from a base station, an uplink feedback indicator indicating whether or not uplink feedback for a paging indicator is enabled. The uplink feedback for a paging indicator may be enabled or disabled by the base station. The uplink feedback indicator may be received via minimum system information. The uplink feedback indicator may also be received via dedicated signaling.

In step S1220, the UE may receive from the base station a paging indicator corresponding to an ID of the UE. The paging indicator corresponding to the ID of the UE may be received from the base station via beam sweeping.

In step S1230, if the uplink feedback indicator indicates that uplink feedback for the paging indicator is enabled, the UE may perform uplink transmission as a response to the paging indicator. Conversely, if the uplink feedback indicator indicates that uplink feedback for the paging indicator is disabled, the uplink transmission may not be performed. The uplink transmission may correspond to the transmission of a random access preamble.

The uplink feedback indicator may indicate whether or not uplink feedback for the paging indicator is enabled within a specific area. If the uplink feedback indicator indicates that the uplink feedback for the paging indicator is enabled within the specific area, and if the UE is present in the specific area, the uplink transmission may be performed within the specific area as a response to the paging indicator. The specific area may correspond to at least any one of a cell, a RAN based notification area, and a tracking area.

The uplink feedback indicator may indicate whether or not uplink feedback for the paging indicator is enabled during a specific RRC state. If the uplink feedback indicator indicates that the uplink feedback for the paging indicator is enabled within the specific area, and if the UE is in the specific RRC state, the uplink transmission may be performed during the specific RRC state as a response to the paging indicator. The specific RRC state may correspond to any one of an RRC_INACTIVE state and an RRC_IDLE state.

Furthermore, the UE may determine whether or not an uplink feedback for the paging indicator is configured (or set up).

Figure 13:
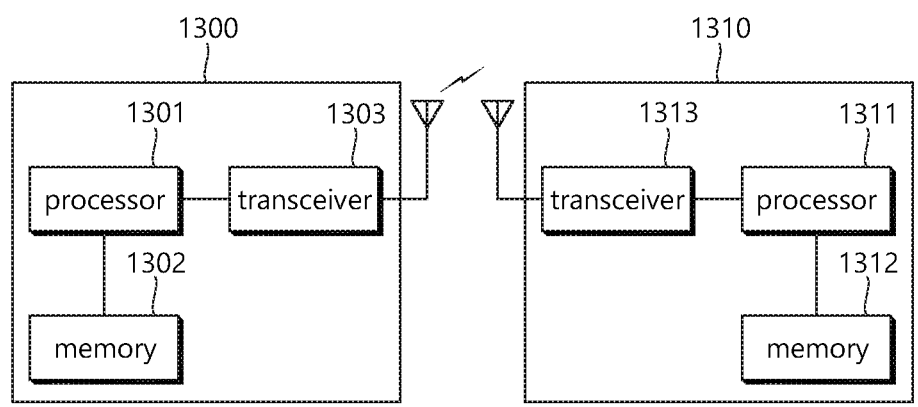
FIG. 13 is a block diagram illustrating a wireless communication system according to an embodiment of the present invention.

FIG. 13 is a block diagram illustrating a wireless communication system according to an embodiment of the present invention.

A BS (1300) includes a processor (1301), a memory (1302) and a transceiver (1303). The memory (1302) is connected to the processor (1301) and stores various information for driving the processor (1301). The transceiver (1303) is connected to the processor (1301) and transmits and/or receives radio signals. The processor (1301) implements proposed functions, processes and/or methods. In the above embodiment, an operation of the BS may be implemented by the processor (1301).

A UE (1310) includes a processor (1311), a memory (1312), and a transceiver (1313). The memory (1312) is connected to the processor (1311) and stores various information for driving the processor (1311). The transceiver (1313) is connected to the processor (1311) and transmits and/or receives radio signals. The processor (1311) implements proposed functions, processes and/or methods. In the above embodiment, an operation of the UE may be implemented by the processor (1311).

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing uplink transmission, by a user equipment (UE), based on information in a wireless communication system, comprising:

receiving, from a base station, the information informing whether or not uplink feedback for a paging indicator is enabled during a specific radio resource control (RRC) state;

receiving, from the base station, the paging indicator, the paging indicator being related to an identity (ID) of the UE; and based on the information informing that the uplink feedback for the paging indicator is enabled during the specific RRC state, performing uplink transmission in response to the paging indicator, wherein the UE is in the specific RRC state, and wherein the specific RRC state includes at least one of an RRC_INACTIVE state or an RRC_IDLE state.

2. The method of claim 1, wherein, based on the information informing that the uplink feedback for the paging indicator is disabled during the specific RRC state, the uplink transmission is not performed.

3. The method of claim 1, wherein the uplink feedback for the paging indicator is enabled or disabled by the base station.

4. The method of claim 1, wherein the uplink transmission includes a transmission of a random access preamble.

5. The method of claim 1, wherein the paging indicator related to the ID of the UE is received, from the base station, via beam sweeping.

6. The method of claim 1, wherein the information is received via minimum system information.

7. The method of claim 1, wherein the information is received via dedicated signaling.

8. The method of claim 1, further comprising:
determining whether or not the uplink feedback for the paging indicator is configured.

9. A user equipment (UE) performing uplink transmission based on an uplink feedback indicator in a wireless communication system, comprising:

a memory;

a transceiver; and a processor operatively connecting the memory and the transceiver that:

controls the transceiver to receive, from a base station, the information informing whether or not uplink feedback for a paging indicator is enabled during a specific radio resource control (RRC) state;

controls the transceiver to receive, from the base station, the paging indicator, the paging indicator being related to an identity (ID) of the UE; and based on the information informing that the uplink feedback for the paging indicator is enabled during the specific RRC state, performs uplink transmission in response to the paging indicator, wherein the UE is in the specific RRC state, and wherein the specific RRC state includes at least one of an RRC_INACTIVE state or an RRC_IDLE state.

10. The method of claim 1, wherein the UE communicates with at least one of a mobile terminal, a network or autonomous vehicles other than the UE.

\* \* \* \* \*